(12) United States Patent
Flory et al.

(10) Patent No.: US 6,687,447 B2
(45) Date of Patent: Feb. 3, 2004

(54) STUB-TUNED PHOTONIC CRYSTAL WAVEGUIDE

(75) Inventors: Curt A. Flory, Los Altos, CA (US); Mihail M. Sigalas, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 212 days.

(21) Appl. No.: 09/846,856

(22) Filed: Apr. 30, 2001

(65) Prior Publication Data

US 2002/0159733 A1 Oct. 31, 2002

(51) Int. Cl.$^7$ ................................................. G02B 6/12
(52) U.S. Cl. ........................... 385/129; 385/14; 385/27; 385/39; 385/47
(58) Field of Search ................................. 385/129–132, 385/14, 24, 27, 37, 39, 40, 45–47; 359/176, 177, 179, 194, 333, 337

(56) References Cited

U.S. PATENT DOCUMENTS

| | | | |
|---|---|---|---|
| 4,550,330 A | 10/1985 | Fowler | 357/16 |
| 5,999,308 A | * 12/1999 | Nelson et al. | 359/321 |
| 6,058,127 A | 5/2000 | Joannopoulos et al. | 372/92 |
| 6,175,671 B1 | * 1/2001 | Roberts | 385/14 |
| 6,198,860 B1 | * 3/2001 | Johnson et al. | 385/28 |

FOREIGN PATENT DOCUMENTS

| | | |
|---|---|---|
| WO | WO 98/26316 | 6/1998 |
| WO | WO 98/57207 | 12/1998 |

OTHER PUBLICATIONS

Sigalas, Mihail M. et al., "Microwave Measurements of Stub Tuners in Two–Dimensional Photonic Crystal Waveguides", Physical Review B, vol. 65, 125209, pp. 1–5, Mar. 15, 2002.

Stoffer, R. et al., "Numerical Studies of 2D Photonic Crystals: Waveguides, Coupling between Waveguides and Filters", Optical and Quantum Electronics, 32, 2000, pp. 947–961 Aug. 2000.

Fan, Shanhui, "Channel Drop Tunneling through Localized States", Physical Review Letters, vol. 80, No. 5, Feb. 2, 1998, pp. 960–963.

Koops, Hans W.P., "Photonic Crystals built by Three–Dimensional Additive Lithography Enable Integrated Optics of High Density", SPIE, vol. 2849, pp. 248–256, Aug. 05, 1996.

Villeneuve, Pierre R. et al., "Microcavities in Photonic Crystals: Mode Symmetry, Tunability, and Coupling Efficiency", Physical Review B, vol. 54, No. 11, pp. 7837–7842 Sep. 15, 1996.

S. Lin, E. Chow, S. Johnson and J. Joannopoulos, "Demostration of Highly Efficient Waveguiding in a Photonic Crystal Slab at the 1.5 um wavelength"; Optics Letter, vol. 25, No. 17; Sep. 1, 2000; pp. 5751–5758.

(List continued on next page.)

*Primary Examiner*—Hung N. Ngo

(57) ABSTRACT

A photonic crystal waveguide apparatus has a photonic crystal having a waveguide which is capable of transmitting light having a frequency within a bandgap of the photonic crystal, and a resonant stub connected to the waveguide to control light in the waveguide. The resonant stub has a resonator region and a connecting channel which connects the resonator region to the waveguide. The resonant stub controls light transmission characteristics of the waveguide by creating a transmission zero in the transmission band of the waveguide. A tuner for tuning the resonant stub may also be provided to control the transmission zero to provide an active optical apparatus such as an on/off switch or a modulator.

20 Claims, 8 Drawing Sheets

OTHER PUBLICATIONS

Z. Shao, W. Porod and C. Lent, "Transmission Resonances and Zeros in Quantum Waveguide Systems with Attached Resonators", Physical Review B, vol. 49, No. 11; Mar. 15, 1994; pp. 7453–7465.

S. Johnson, S. Fan, P. Villeneuve, J. Joannopoulos, and L. Kolodziejski, "Guided Modes in Photonic Crystal Slabs", Physical Review, vol. 60, No. 8; Aug. 15, 1999, pp 5751–5758.

* cited by examiner

STUB-TUNED PHOTONIC CRYSTAL WAVEGUIDE

BACKGROUND OF THE INVENTION

1. Field of the Invention

The present invention relates generally to the field of photonic crystals; and, more particularly, to a photonic crystal waveguide apparatus having a resonant stub tuner.

2. Description of Related Art

Photonic crystals (PC) are periodic dielectric structures which can prohibit the propagation of light in certain frequency ranges. More particularly, photonic crystals have spatially periodic variations in refractive index; and with a sufficiently high refractive index contrast, photonic bandgaps can be opened in the structure's optical transmission characteristics. (The term "photonic bandgap" as used herein and as is commonly used in the art is a frequency range in which propagation of light through the photonic crystal is prevented. In addition, the term "light" as used herein is intended to include radiation throughout the electromagnetic spectrum, and is not limited to visible light.)

It is known that introducing defects in the periodic structure of the photonic crystal allows the existence of localized electromagnetic states that are trapped at the defect site, and that have resonant frequencies within the bandgap of the surrounding photonic crystal material. By providing a region of such defects extending through the photonic crystal, a waveguiding structure is created which can be used in the control and guiding of light.

A photonic crystal which has spatial periodicity in three dimensions can prevent the propagation of light having a frequency within the crystal's bandgap in all directions; however, the fabrication of such a structure is technically challenging. A more attractive alternative is to utilize a 2-dimensional photonic crystal slab that has a two-dimensional periodic lattice incorporated within it. In a structure of this sort, light propagating in the slab is confined in the direction perpendicular to a major surface of the slab via total internal reflection, and light propagating in the slab in directions other than perpendicular to a major surface is controlled by the properties of the photonic crystal slab. A two-dimensional photonic crystal slab has the advantage that it is compatible with the planar technologies of standard semiconductor processing; and, in addition, the planar structure of the slab makes an optical signal in a waveguide created in the slab more easily accessible to interaction. This provides the additional advantage that the structure is susceptible to being used to create active devices.

Both theoretical and experimental work have demonstrated the efficient guidance of light in a two-dimensional photonic crystal slab waveguide device (see "Demonstration of Highly Efficient Waveguiding in a Photonic Crystal Slab at the 1.5 $\mu$m Wavelength", S. Lin, E. Chow, S. Johnson and J. Joannopoulos, Opt. Lett. 25, pp. 1297–1299, 2000). Furthermore, experimental work is also beginning to demonstrate the capability of fabricating such devices that are able to propagate light with a high degree of efficiency; and it is only a matter of time before the fabrication of excellent photonic crystal waveguide devices become routine. As a result, there has already been some investigation into potential applications for interacting with the guided optical modes of the waveguide device. Such applications which have previously been discussed include static (fixed wavelength) or tunable channel drop filters, and tunable resonant microcavity defects (see U.S. Pat. No. 6,058,127).

An optical modulator and an optical switch which are based upon tunable resonant microcavity defects have also been described in the literature. In these devices, a waveguide structure is described which has a one-dimensional periodic dielectric photonic crystal along the propagation axis. This photonic crystal structure generates a frequency stop band in the transmission characteristic of the waveguide. Additionally, a defect is introduced in the periodic structure causing a localized resonant mode to occur within the frequency stop band of the waveguide. This resonant mode allows tunneling from one side of the defect to the other when the guided mode of the waveguide has a frequency which precisely matches that of the defect resonance. In this way, light can propagate down the waveguide, tunnel through the resonant defect and continue down the waveguide with a relatively high efficiency.

It is further described how the dielectric constant of the resonant defect region of the device can be changed via current injection or optical non-linearities so as to make the resonant frequency tunable, and thus provide a narrow band optical modulator or a tunable narrow passband switch.

SUMMARY OF THE INVENTION

The present invention provides a photonic crystal waveguide apparatus for controlling the transmission of light in a waveguide of the apparatus.

An exemplary photonic crystal waveguide apparatus according to the present invention may comprise a photonic crystal, a waveguide in the photonic crystal which is capable of transmitting light having a frequency within a bandgap of the photonic crystal, and a resonant stub connected to the waveguide to control light in the waveguide.

According to a first embodiment of the invention, the resonant stub comprises a resonator region and a connecting channel connecting the resonator region and the waveguide; and the resonator region and the connecting channel cooperate to control transmission characteristics of light in the waveguide. In particular, the resonator region and the connecting channel function to create a frequency range, commonly referred to as a "transmission zero", within the bandgap of the photonic crystal at which light that is otherwise capable of being transmitted by the waveguide is prevented from being transmitted. The frequency of the transmission zero is a function of the resonant frequency of the resonator region, while the width of the transmission zero is a function of parameters of the connecting channel. Accordingly, by controlling parameters of the resonator region and of the connecting channel, the frequency of the transmission zero and its width can be controlled.

In accordance with a second embodiment of the invention, the waveguide comprises a region of first defects in a periodic lattice of the photonic crystal which extends through the photonic crystal; and the connecting channel comprises one or more second defects in the periodic lattice which are connected to the waveguide and which extend angularly from a sidewall of the waveguide. The resonator region comprises a region in the photonic crystal in which the periodic lattice has been modified in an appropriate manner to define a resonator chamber.

According to a third embodiment of the invention, the periodic lattice of the photonic crystal comprises an array of posts, and the waveguide is created by omitting a single line of the posts. The connecting channel is created by omitting two additional posts in the lattice to define a short channel which is connected to the waveguide and which extends perpendicularly from a sidewall of the waveguide. The resonator region comprises a generally square region having a 3×3 sub-array of posts which are larger in diameter than the other posts in the lattice. By controlling parameters of the resonator region, such as the number of posts in the region and the size of the posts; the resonant frequency of the resonator region, and, hence, the spectral position of the transmission zero can be effectively controlled. By controlling one or more parameters of the connecting channel, such as its length and width, and, in embodiments in which the connecting channel includes posts, the presence, absence and modification of posts in the connecting channel; the spectral widths of the transmission zero can be controlled.

According to a fourth embodiment of the present invention, the apparatus includes a tuner for tuning parameters of the resonant modes of the resonant stub. The tuner may comprise a dielectric constant tuner for tuning the dielectric constant of the material comprising the posts in the resonator region. The dielectric constant tuner can be an electronic tuner for tuning the dielectric constant using, for example, the charge carrier effect or the electro-optic effect. Alternatively, the tuner can be an optical tuner for tuning the dielectric constant using, for example, the photorefractive effect. The tuner permits the waveguide transmission to be effectively tuned within a range extending from essentially zero transmission to substantially the full transmission value for the photonic crystal waveguide apparatus. This capability enables a wide variety of photonic crystal devices to be realized which can be utilized in essentially any application in which a tunable optical filter can be used including, but not limited to, on/off switches and optical modulators.

A photonic crystal waveguide apparatus according to the present invention operates as a tunable notch filter, where the action of the resonator is as a purely reflective agent causing the propagation characteristic of the waveguide to have a transmission zero at specified, tunable frequencies. The apparatus of the present invention is, accordingly, fundamentally different from other tuned photonic crystal devices that are known in the art.

Yet further advantages and specific features of the present invention will become apparent hereinafter in conjunction with the following detailed description of presently preferred embodiments of the invention.

DETAILED DESCRIPTION OF THE INVENTION

Figure 1:
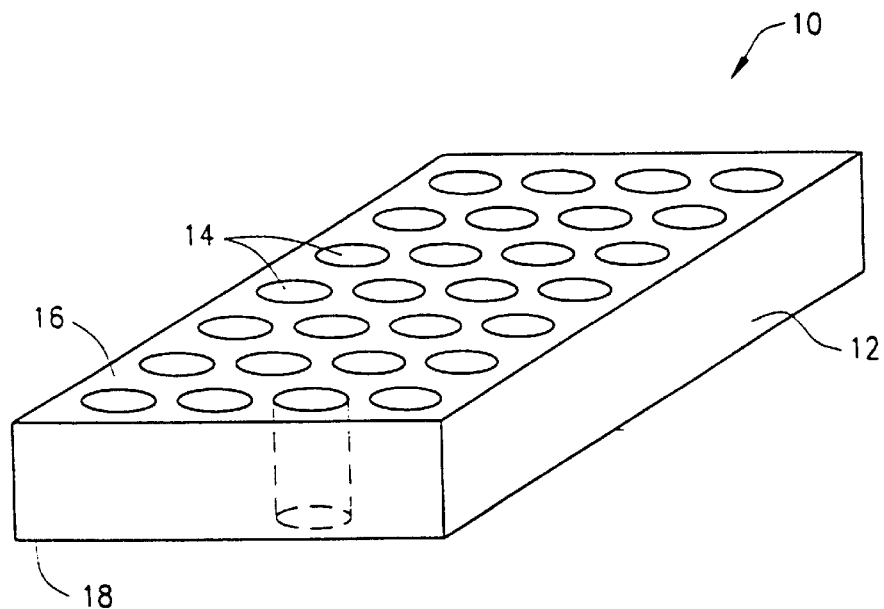
FIG. 1 is a schematic, perspective view of a two-dimensional photonic crystal slab as is known in the prior art.

FIG. 1 illustrates a two-dimensional photonic crystal slab that is known in the prior art, and is provided to assist in explaining the present invention. The photonic crystal slab is generally designated by reference number 10, and comprises a slab body 12 having an array of posts 14 therein. As shown in FIG. 1, the posts 14 are oriented parallel to one another and extend through the slab body from top face 16 to bottom face 18 thereof.

The two-dimensional photonic crystal slab 10 can take various forms. For example, the posts 14 can comprise rods formed of a first dielectric material, and the slab body 12 can comprise a body formed of a second dielectric material which differs in dielectric constant from that of the first dielectric material. Alternatively, the posts can comprise holes formed in a slab body of dielectric material; or the posts can comprise rods of dielectric material and the slab body can be air, or another gas, or a vacuum. In addition, the posts can be arranged to define a square array of posts; or they can be arranged in a different manner, such as in a rectangular array or a triangular array.

In a two-dimensional photonic crystal slab such as illustrated in FIG. 1, light propagating in the slab is confined in the direction perpendicular to the slab faces 16 and 18 via total internal reflection. Light propagating in the slab in directions other than perpendicular to the slab faces, however, is controlled by the spatially periodic structure of the slab. In particular, the spatially periodic structure causes a photonic bandgap to be opened in the transmission characteristics of the structure within which the propagation of light through the slab is prevented. Specifically, light propagating in the two-dimensional photonic crystal slab of FIG. 1 in directions other than perpendicular to a slab face and having a frequency within a bandgap of the slab will not propagate through the slab; while light having frequencies outside the bandgap is transmitted through the slab unhindered.

It is known in the prior art that the introduction of defects in the periodic lattice of a photonic crystal allows the existence of localized electromagnetic states which are trapped at the defect site, and which have resonant frequencies within the bandgap of the surrounding photonic crystal material. By arranging these defects in an appropriate manner; a waveguide can be created in the photonic crystal through which light having frequencies within the bandgap of the photonic crystal (and that thus would normally be prevented from propagating through the photonic crystal) is transmitted through the photonic crystal.

Figure 2:
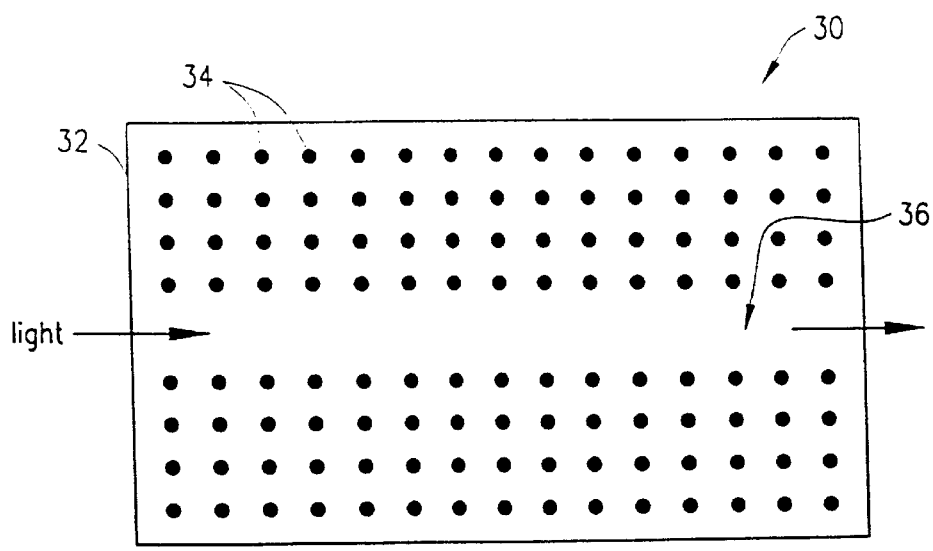
FIG. 2 is a schematic, cross-sectional view of a two-dimensional photonic crystal slab waveguide apparatus as is known in the prior art.

FIG. 2 illustrates a two-dimensional photonic crystal slab waveguide apparatus 30 that is known in the prior art. Apparatus 30 comprises a photonic crystal slab 32 comprised of a rectangular array of dielectric rods 34 in air. A region of defects in the photonic crystal slab creates a waveguide 36 through which light having a frequency within the bandgap of the surrounding photonic crystal material can propagate. In the photonic crystal slab of FIG. 2, the region of defects is provided by omitting one row of the rods 34. The region of defects can also be provided in other ways; for example, by altering the rods in one or more rows such as by removing portions of the rods or by changing the diameter of the rods. The region of defects can extend in a straight line, as shown in FIG. 2, to define a straight waveguide; or the region can be arranged to include a bend, for example, a 90 degree bend, to define a bent waveguide.

In order to explain the transmission characteristics of the two-dimensional photonic crystal slab waveguide apparatus 30 of FIG. 2, an example of a simulation that has been conducted using the apparatus will now be described. This simulation, as well as other simulations to be described hereinafter, was conducted using 2-dimensional Finite Difference Time-Domain (FDTD) techniques (see "Computational Electrodynamics, the Finite-Difference Time-Domain Method", A. Taflove, Artech House, 1995).

In the simulation, the photonic crystal waveguide apparatus comprised a square array of dielectric rods in air. The rods had a radius of $0.18a_o$, where $a_o$ is the spacing between the rods. For the simulation, it was assumed that the dielectric constant of the rods relative to the air is equal to 11.4.

From previous calculations, it has been demonstrated that an infinite photonic crystal material will not propagate TM electromagnetic radiation within a calculable bandgap (see "Photonic Crystals", J. Joannopoulos, R. Meade and J. Winn, Princeton University Press, 1995). This bandgap extends from a reduced frequency of approximately 0.32 to a reduced frequency of approximately 0.45, where the reduced frequency is defined in units of $(c/a_o)$, where c is the velocity of light in a vacuum. A waveguide created in the photonic crystal material by omitting a row of rods, as shown in FIG. 2, transmits light with a frequency lying within the photonic bandgap. For light with a frequency outside of this bandgap, the photonic crystal would not confine the radiation, rendering the waveguide highly lossy.

Figure 3:
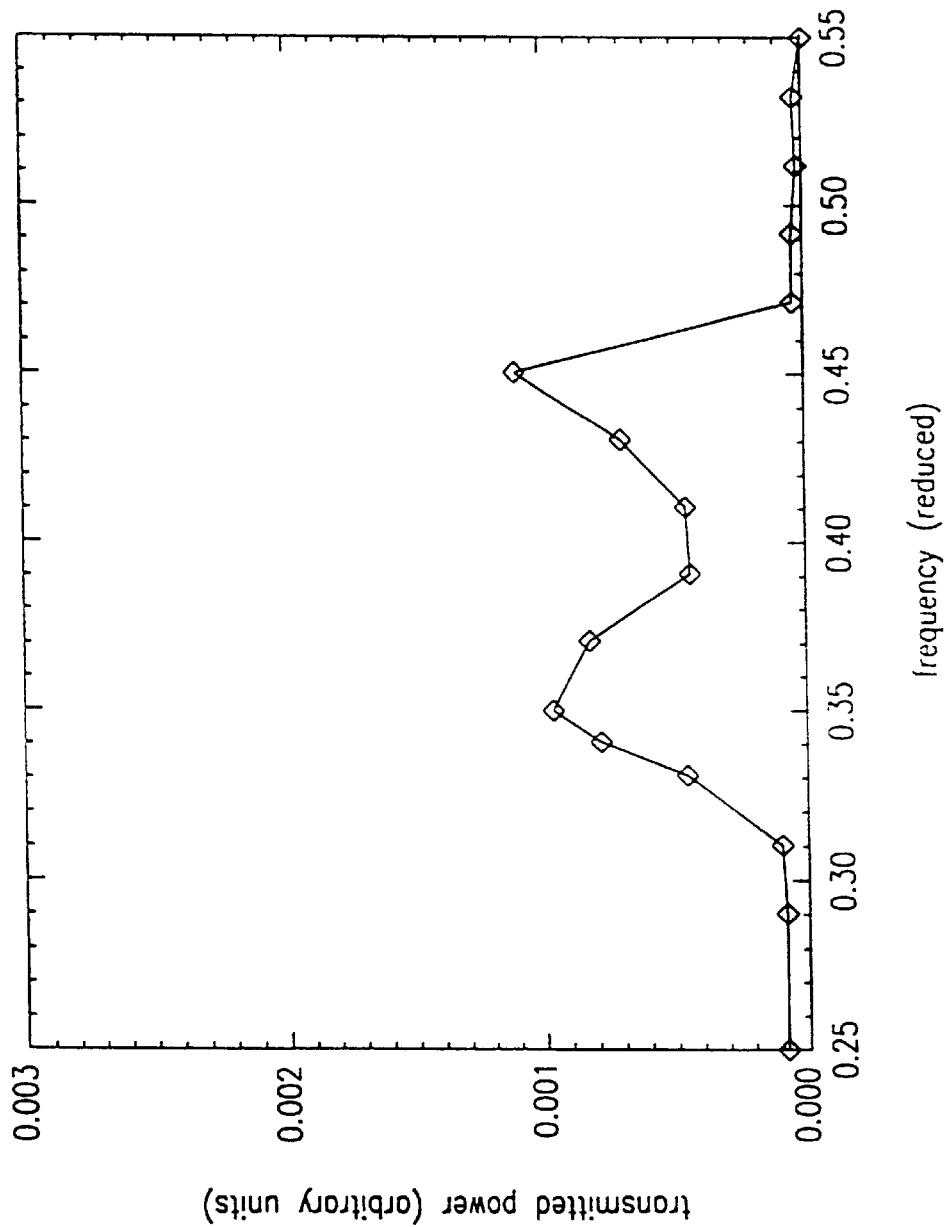
FIG. 3 is a graph that illustrates power transmission characteristics of incident light as a function of frequency for the waveguide apparatus of FIG. 2.

FIG. 3 is a graph illustrating the results of a simulation conducted using the waveguide apparatus of FIG. 2 having the parameters described above. Plotted is the power transmitted through the waveguide as a function of reduced frequency. As shown, the waveguide has a relatively flat transmission characteristic for frequencies lying within the photonic crystal bandgap (from about 0.32 to about 0.45).

The above-described simulation and other theoretical and experimental work that has been conducted demonstrate the capability of efficiently guiding light through a two-dimensional photonic crystal slab waveguide.

Figure 4:
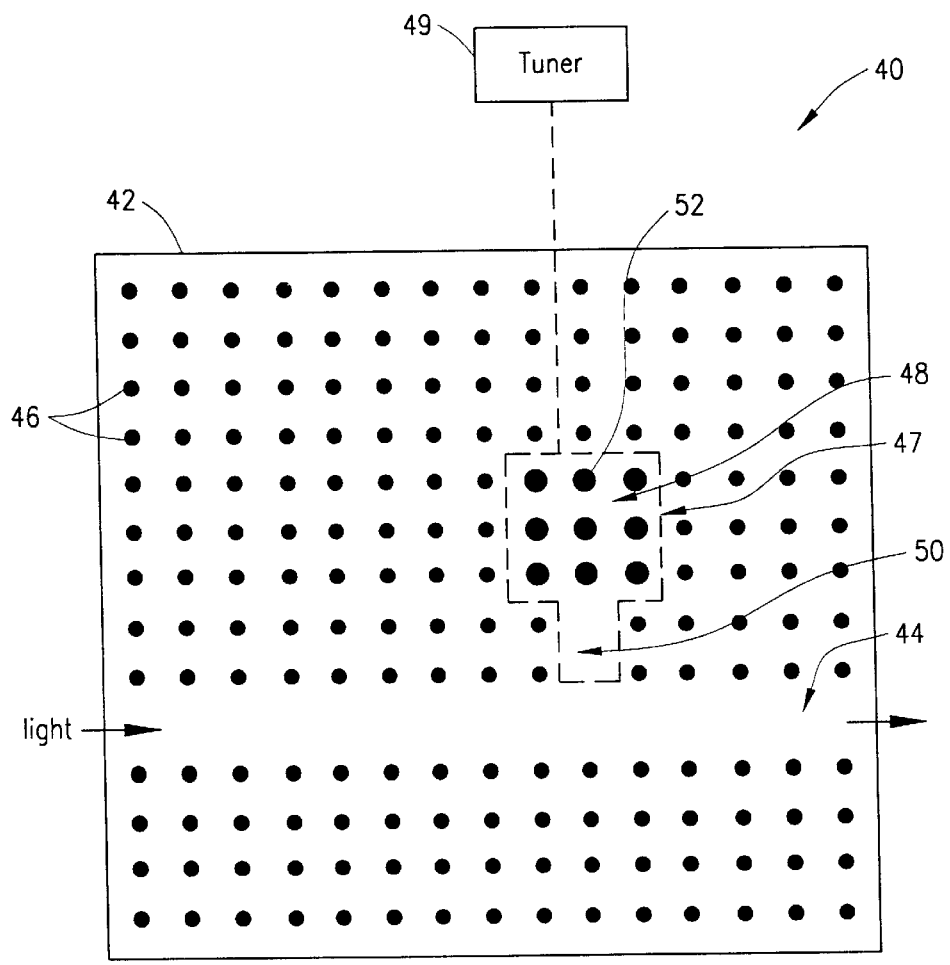
FIG. 4 is a schematic, cross-sectional view of a two-dimensional photonic crystal slab waveguide apparatus according to an embodiment of the present invention.

FIG. 4 illustrates a two-dimensional stub-tuned photonic crystal waveguide apparatus according to an embodiment of the invention. The apparatus is generally designated by reference number 40, and comprises a two-dimensional photonic crystal slab 42 having a waveguide 44 extending therethrough and created by omitting a single line of rods 46 of the array as described above with reference to FIG. 2. In addition, the photonic crystal slab 42 includes a resonant stub 47 (shown in dashed line) which extends from a sidewall of the waveguide 44 to control light in the waveguide. The resonant stub 47 includes a resonator region 48 and a connecting channel 50.

In the embodiment illustrated in FIG. 4, connecting channel 50 comprises a short channel that extends from a sidewall of the waveguide 44 in a direction perpendicular to the waveguide; and is created by omitting two posts 46 from the array of posts. The resonator region 48 comprises a generally square region having a 3×3 sub-array of posts 52 which are larger in diameter than the posts 46. As should be apparent from FIG. 4, the connecting channel 50 comprises a short waveguide section which connects the resonator region 48 and the waveguide 44.

The operation of the photonic crystal stub-tuned waveguide apparatus of FIG. 4 can best be explained by describing a simulation that was conducted. In this simulation, the radius of the posts 46 of the array is the same as in the simulation described with reference to FIG. 2, i.e., $0.18a_o$, and the waveguide 44 was created, as before, by omitting a row of the posts. The connecting channel 50 was created by omitting two of the posts 46 to define a short connecting channel 50 extending perpendicular to the waveguide 44. The resonator region 48 was created by providing a 3×3 sub-array of posts 52, each of which had a radius of $0.25a_o$.

Figure 5:
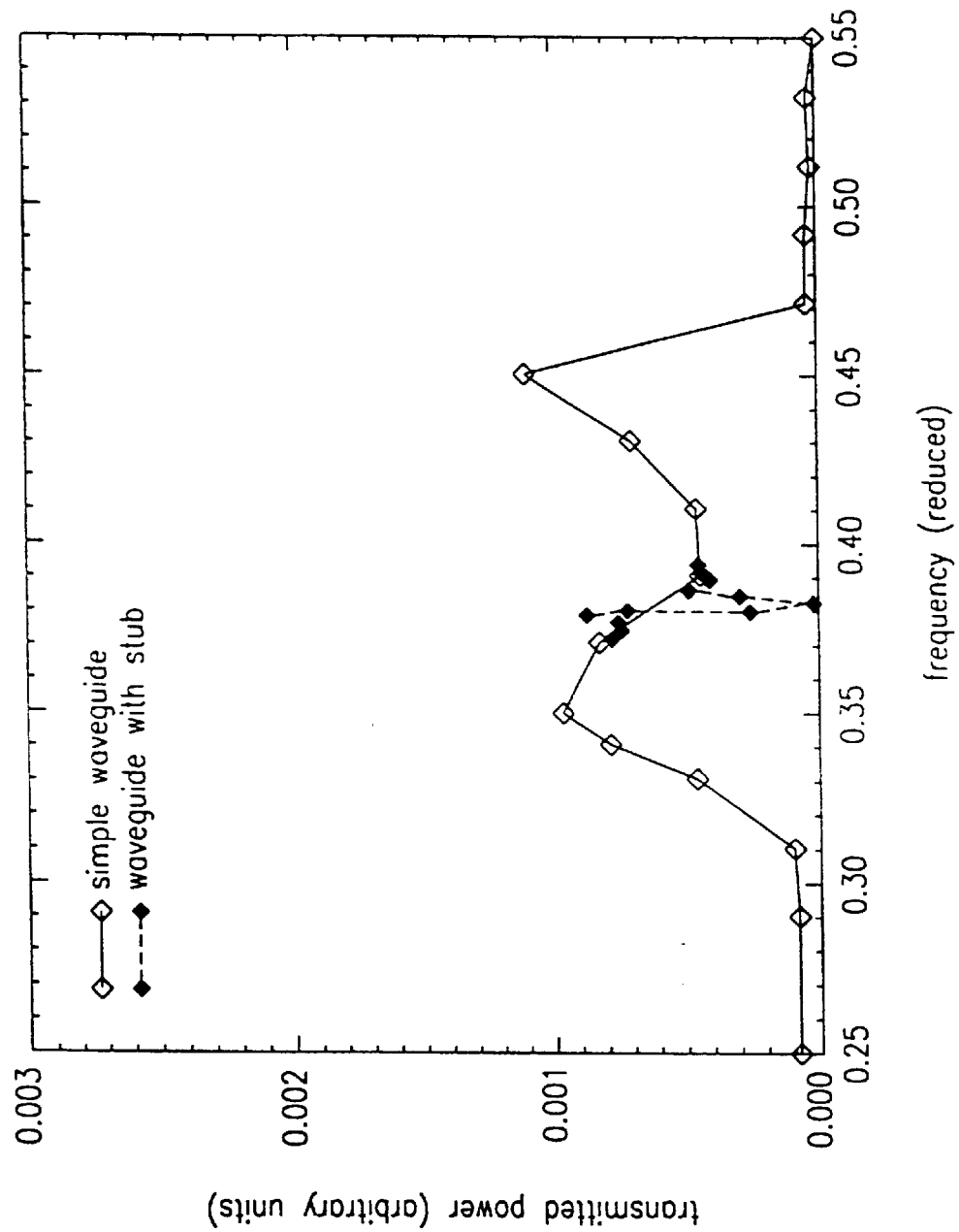
FIG. 5 is a graph that illustrates power transmission characteristics of incident light as a function of frequency for the waveguide apparatus of FIG. 4.

FIG. 5 is a graph similar to that of FIG. 3 and illustrates the results of the simulation conducted using the apparatus of FIG. 4 having the parameters described above. Results of the simulation show that the waveguide transmission characteristics of the waveguide apparatus of FIG. 2 were modified by a sharp transmission zero illustrated by the dashed line in FIG. 5. This transmission zero is a narrow range of frequencies within the bandgap of the photonic crystal material at which light that is otherwise capable of propagating through the waveguide 44 (as is shown in FIG. 3), is prevented from propagating through the waveguide. The frequency of the transmission zero corresponds to a resonant frequency of the 3×3 resonator region 48, while properties of the connecting channel control the coupling between the resonator region and the waveguide 44. The coupling controls the quality factor (Q-factor) of the resonator region; and, thus, the bandwidth of the transmission zero.

Figure 6B:
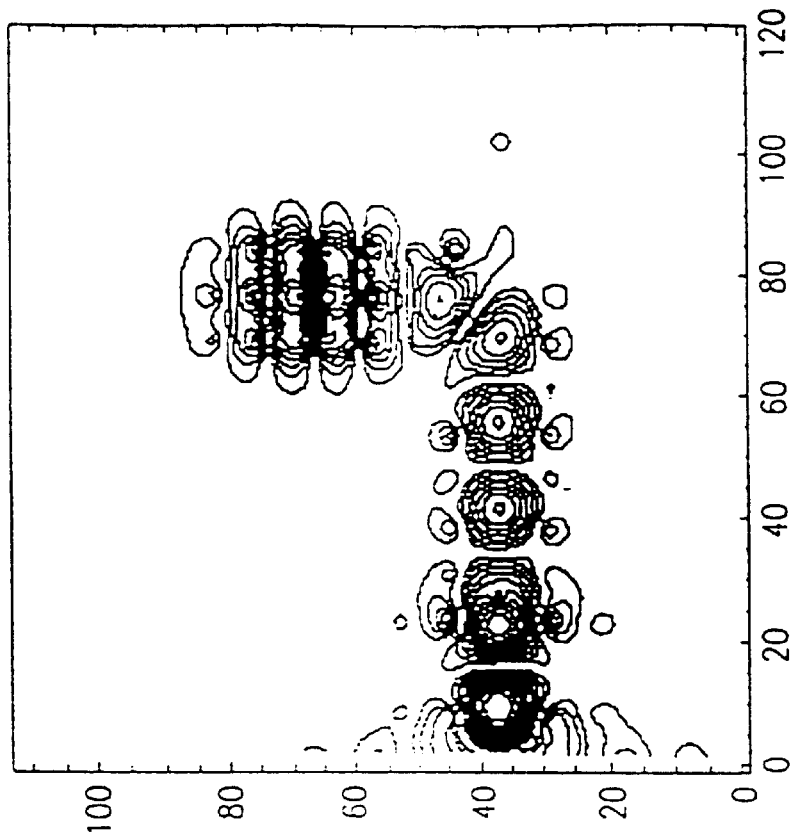
FIG. 6b is a field magnitude plot for the waveguide apparatus of FIG. 4 for a frequency at the transmission zero.
Figure 6A:
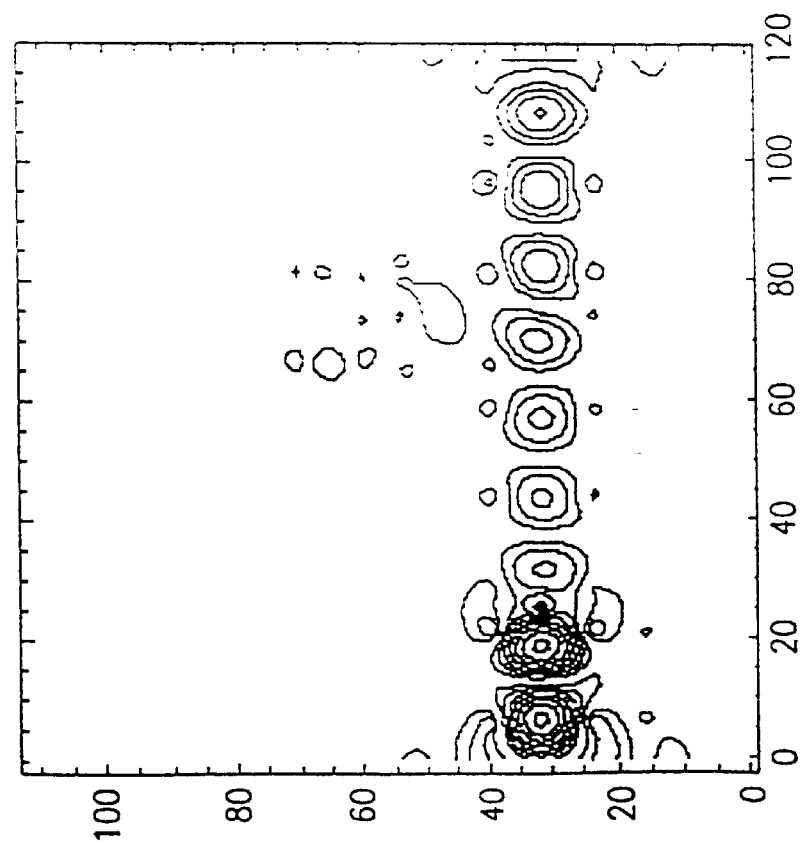
FIG. 6a is a field magnitude plot for the waveguide apparatus of FIG. 4 for a frequency away from the transmission zero.

In order to further illustrate the physical mechanism by which light is blocked by the stub at resonant frequencies, FIGS. 6a and 6b are contour plots of the computed field magnitudes for a frequency away from the transmission zero (i.e., at ν=0.395) and at the center of the transmission zero (i.e., at ν=0.384), respectively. Note that the stub has very little interaction with the propagating waveguide mode for frequencies away from the transmission zero, as shown in FIG. 6a. However, for frequencies near the transmission zero, the resonator region of the stub contains a great deal of electromagnetic energy. This energy leaks back into the waveguide with a magnitude and phase that cause a full reflection of the incident light, as shown in FIG. 6b.

The photonic crystal stub-tuned waveguide apparatus 40 of FIG. 4 provides a great deal of design flexibility for controlling light in the waveguide 44. For example, by controlling parameters of the resonator region, the resonant frequency of the resonator region can be controlled; and this, in turn, controls the frequency of the transmission zero. By controlling parameters of the connecting channel, the coupling between the resonator region and the waveguide can be controlled. This, in turn, controls the quality factor of the resonant region and thus the bandwidth of the transmission zero. The resonator region parameters that can be controlled include, for example, the number of posts comprising the region and the diameter of the posts, both of which will contribute to defining the resonance frequency. Connecting channel parameters that can be controlled include, for example, the length and width of the channel, the number of posts omitted from the channel, and the number of posts and the diameter of posts included in the channel (in embodiments in which posts are included in the connecting channel).

According to a further embodiment of the invention, in addition to controlling design parameters of the resonant stub of the waveguide apparatus to control transmission characteristics of the waveguide; a tuner is additionally provided to control properties of the transmission zero by tuning parameters of the resonant modes of the stub. Preferably, the tuner, which is schematically illustrated in FIG. 4 by reference number 49, comprises a dielectric constant tuner for tuning the dielectric constant of the material comprising the posts in the resonator region. Such dielectric constant tuners are well-known to those skilled in the art, and thus need not be described in any detail herein, and can be either electronic or optical. For example, an electronic dielectric constant tuner may utilize the charge carrier effect or the electro-optic effect. An optical dielectric constant tuner may utilize the photorefractive effect. Although all of these effects are relatively small in the optical frequency regime, they appear large enough to effect appropriate tuning of the apparatus of the present invention.

Figure 7:
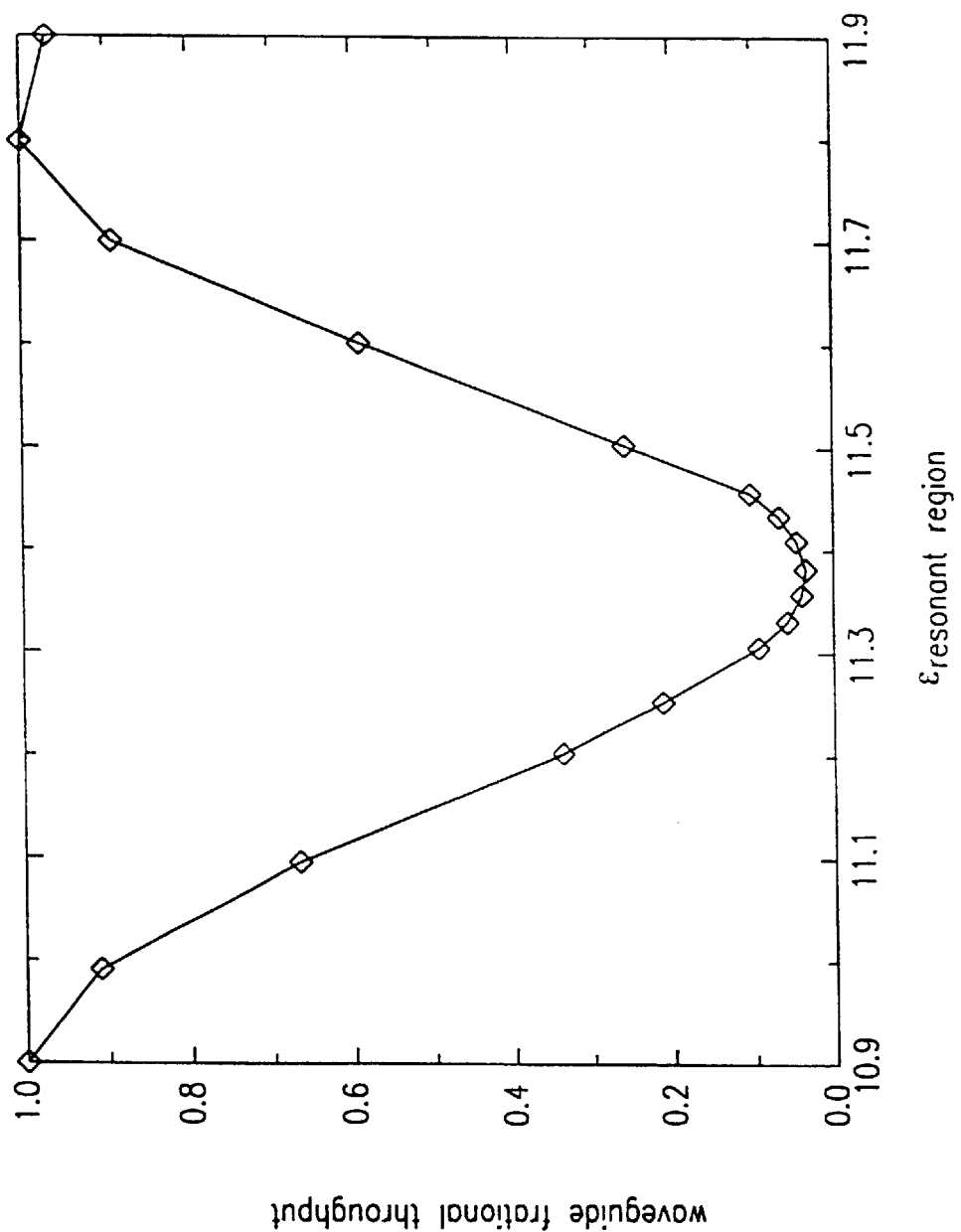
FIG. 7 is a graph that illustrates the normalized transmission characteristics of the apparatus of FIG. 4 as a function of the dielectric constant of posts in the resonator region.
Figure 8B:
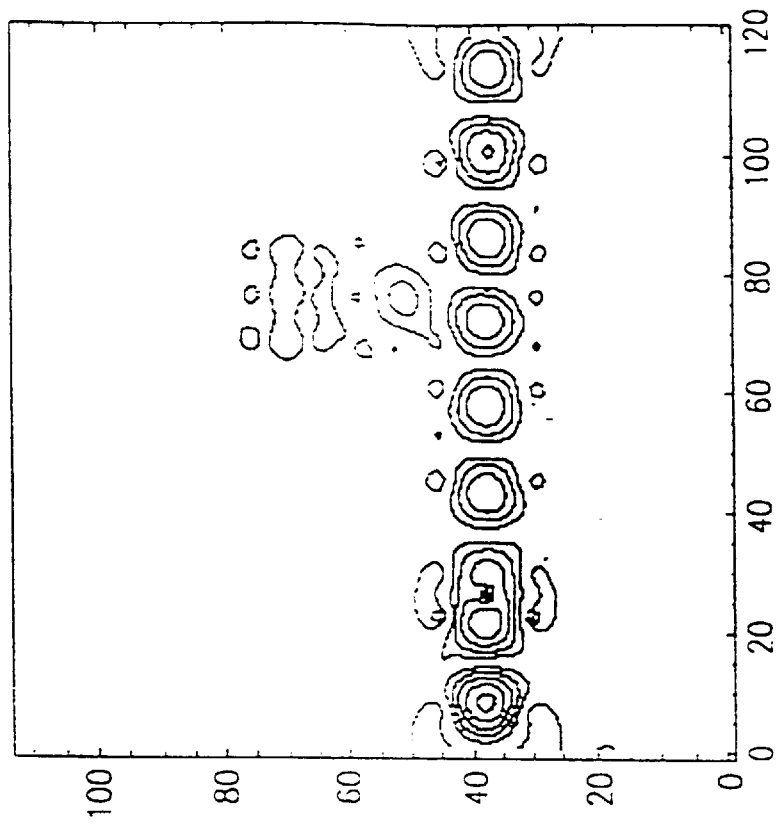
FIG. 8b is a field magnitude plot for the waveguide apparatus of FIG. 4 for a frequency at the transmission zero and for a dielectric constant of posts in the resonator region at a value 4% higher than the nominal value.
Figure 8A:
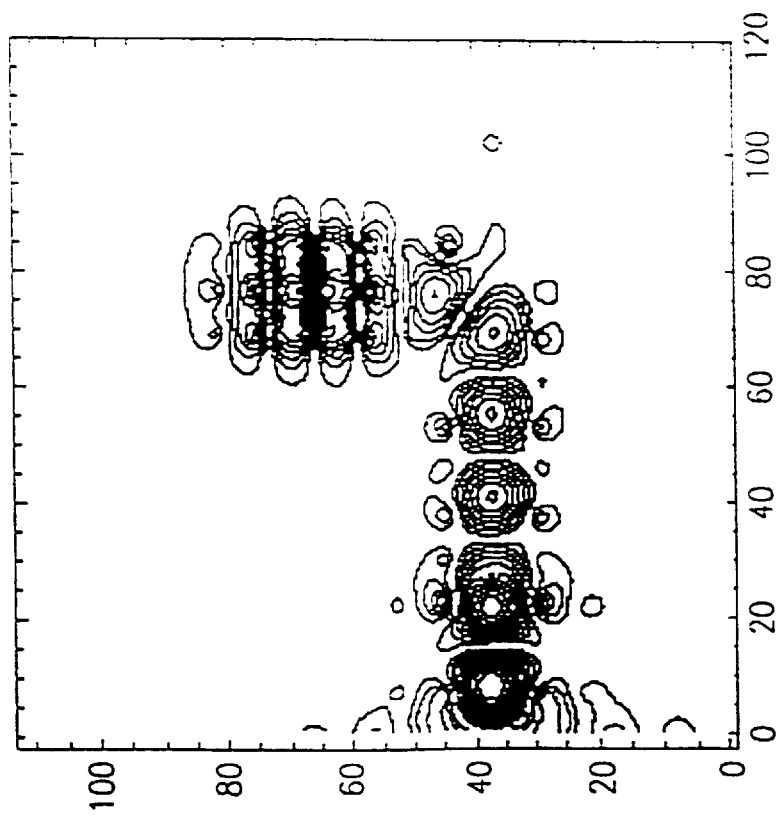
FIG. 8a is a field magnitude plot of the waveguide apparatus of FIG. 4 for a frequency at the transmission zero and for a dielectric constant of posts in the resonator region at a nominal value.

FIG. 7 is a plot illustrating the waveguide transmission for incident light at a fixed frequency corresponding to the frequency of the transmission zero of the "un-tuned" stub waveguide apparatus of FIG. 4, computed as a function of the effective dielectric constant of the posts in the resonator region. Note that when the posts of the resonator region have the nominal dielectric value of 11.4, the waveguide transmission is effectively zero. As the dielectric constant of the resonator region posts is tuned by only a few percent, the waveguide transmission approaches the fill value calculated for the photonic crystal waveguide without a tuner as is shown in FIG. 3. FIGS. 8a and 8b are contour plots of the computed field magnitudes for the nominal-zero transmission case and for the case where the dielectric constant of the resonator region has been increased by 4%, respectively. The illustrated behavior clearly corresponds to the operation of an on/off optical switch as the dielectric constant is switched from one to another value through the full range plotted. The described behavior also clearly corresponds to the operation of an optical modulator as the dielectric constant is tuned through intermediate values.

The simulated performance described above is intended to be exemplary only, as operational characteristics of the apparatus of the present invention can be modified in many ways. For example, by reducing the coupling between the waveguide and the resonator region through modification of the connecting channel; the width of the zero notch shown in FIG. 5 can be reduced, leading to enhanced sensitivity to the dielectric constant tuning of the resonator region posts. This will permit switching to be achieved with much smaller changes in the dielectric constant, but with a reduced frequency tuning range. All of the methods described herein for modifying specific operational characteristics of the photonic crystal waveguide apparatus of the invention, as well as other methods, will be readily apparent to those skilled in the art; and it is not intended to limit the invention in this regard.

It should also be recognized that the simulations described above were done in two dimensions, ignoring the effects of the dimension parallel to the constituent dielectric posts. It is known in the art that the generalization of structures of this sort to three dimensions results in some quantitative differences in the computed results; however, the qualitative operative physical characteristics are maintained.

Figure 9A:
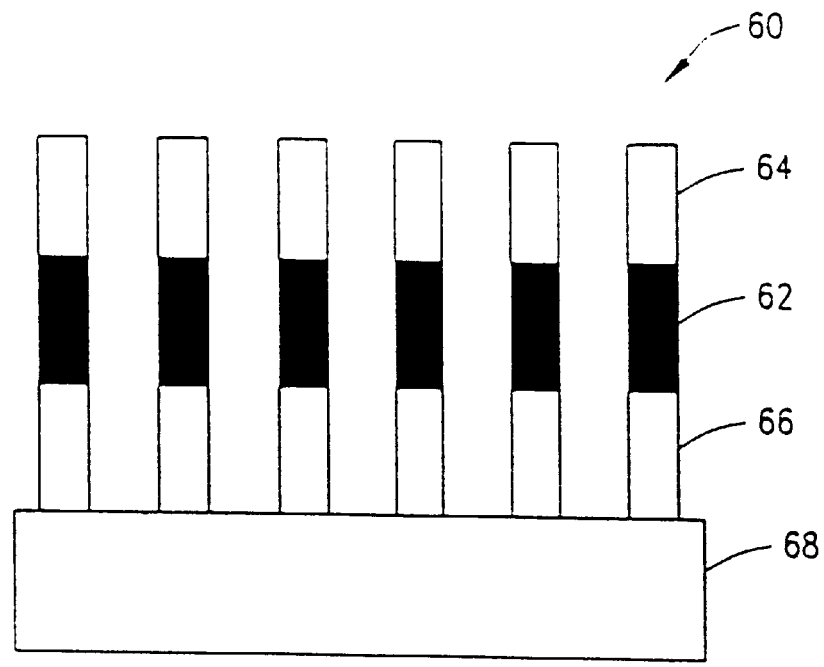
FIGS. 9a and 9b schematically illustrate two exemplary geometries of explicit three-dimensional realizations of a photonic crystal "dielectric slab of posts" which may be used in three-dimensional implementations of the present invention.
Figure 9B:
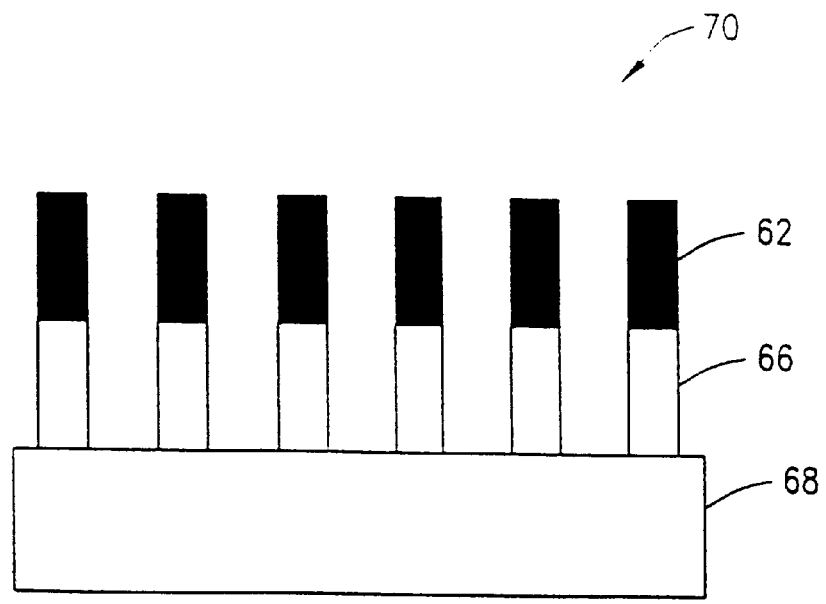

The photonic crystal lattice structure incorporated in the previously described two-dimensional structures can take a number of three-dimensional realizations. Two exemplary three-dimensional geometries are shown in FIGS. 9a and 9b, making explicit the finite length of the dielectric posts. In the structure 60 illustrated in FIG. 9a, post units comprising photonic crystal post portions 62 are sandwiched between upper and lower cladding layer post portions 64 and 66, with each post unit being supported on a substrate 68. The structure 70 shown in FIG. 9b, lacks the upper cladding post portions 64.

As described previously, in the apparatus of FIG. 4, optical confinement in the dimension parallel to the posts is effected by the larger dielectric constant of the photonic crystal region, leading to total internal reflection of the light in this dimension. It should also be noted that another realization could be to have the posts of the photonic crystal "sandwiched" between two reflective surfaces, either dielectric or metallic, to provide the confinement necessary in the dimension parallel to the posts.

It should also be understood that although the photonic crystal waveguide apparatus described above generally comprise arrays of dielectric rods in air; the photonic crystals can also be composed of an array of gas or vacuum "filled" holes in a dielectric substrate, or an array of dielectric rods embedded in a body of a dielectric material having a different dielectric constant than that of the material of the rods. In addition, although the above embodiments generally describe two-dimensional apparatus; the invention can also be applied to fully three-dimensional photonic crystal apparatus with the same sort of operational characteristics.

In general, the photonic crystal waveguide apparatus of the present invention operates as a tunable notch filter, where the action of the resonator is as a purely reflective agent causing the propagation characteristic of the waveguide to have a transmission zero at a specified, tunable frequency. The apparatus can be employed as an on/off optical switch and as an optical modulator, as described above; and, in general, can be used in any application where a tunable optical filter would be useful, with one example being as a channel drop filter. The tuning agent can be either electronically or optically activated.

While what has been described constitutes presently preferred embodiments of the invention, it should be recognized that the invention can take many other forms. For example, although the embodiments described herein include a single resonant stub extending from the waveguide, in other embodiments, two or more resonant stubs may be provided. By providing two or more resonant stubs having resonator regions and/or connecting channels with different parameters, and sufficiently spaced from one another so as to not interfere, two or more transmission zeros can be created in the bandgap of the photonic crystal.

Because the invention can take numerous forms, it should be understood that the invention should be limited only insofar as is required by the scope of the following claims.

What is claimed is:

1. A photonic crystal waveguide apparatus, comprising:
   a photonic crystal;
   a waveguide in said photonic crystal which is capable of transmitting light having a frequency within a bandgap of said photonic crystal; and
   a resonant stub connected to and extending from said waveguide to control light in the waveguide.

2. The photonic crystal waveguide apparatus according to claim 1, wherein said resonant stub comprises a resonator region and a connecting channel connecting said resonator region and said waveguide.

3. The photonic crystal waveguide apparatus according to claim 2, wherein said connecting channel extends perpendicular from a sidewall of said waveguide.

4. The photonic crystal waveguide apparatus according to claim 2, wherein said photonic crystal includes a periodic lattice, and wherein said waveguide comprises a region of first defects in said periodic lattice, and wherein said connecting channel comprises at least one second defect in said periodic lattice.

5. The photonic crystal waveguide apparatus according to claim 4, wherein said resonator region comprises a modified portion of said periodic lattice.

6. The photonic crystal waveguide apparatus according to claim 5, wherein said periodic lattice comprises an array of posts, and wherein said resonator region comprises a sub-array of said array of posts, said sub-array comprising posts having a diameter different from other posts in said array.

7. The photonic crystal waveguide apparatus according to claim 6, wherein design parameters of said resonator region control a frequency of a transmission zero in said bandgap at which transmission of light is prevented, and wherein design parameters of said connecting channel control a width of said transmission zero, said design parameters of said resonator region including at least one of the number of said posts in said resonator region and their diameter, and said design parameters of said connecting channel including at least one of length and width of said connecting channel and presence, omission or modification of posts in said connecting channel.

8. The photonic crystal waveguide apparatus according to claim 7, and further including a tuner for controlling properties of said transmission zero.

9. The photonic crystal waveguide apparatus according to claim 8, wherein said tuner comprises a dielectric constant tuner for tuning a dielectric constant of a material comprising said posts in said resonator region.

10. The photonic crystal waveguide apparatus according to claim 9, wherein said dielectric constant tuner comprises a dielectric constant tuner selected from the group consisting of an electronic dielectric constant tuner and an optical dielectric constant tuner.

11. The photonic crystal waveguide apparatus according to claim 8, wherein said apparatus comprises an apparatus selected from the group consisting of an on/off switch and a modulator.

12. The photonic crystal waveguide apparatus according to claim 1, wherein said photonic crystal comprises a two-dimensional photonic crystal slab.

13. A photonic crystal waveguide apparatus comprising
a photonic crystal, said photonic crystal comprising a periodic lattice;
a waveguide in said photonic crystal, said waveguide comprising a region of first defects in said periodic lattice and being capable of transmitting light having a frequency within a bandgap of the photonic crystal; and
a resonant stub extending from a sidewall of said waveguide to control light transmission characteristics of said waveguide by creating a transmission zero in said bandgap at which light of a frequency that is otherwise capable of being transmitted by said waveguide is prevented from being transmitted by said waveguide.

14. The photonic crystal waveguide apparatus according to claim 13, wherein said resonant stub comprises a resonator region and a connecting channel connecting said resonator region to said waveguide, and wherein parameters of said resonator region control the frequency of said transmission zero and parameters of said connecting channel control the width of said transmission zero.

15. The photonic crystal waveguide apparatus according to claim 14, and further including a tuner for controlling properties of said at least one transmission zero.

16. The photonic crystal waveguide apparatus according to claim 15, wherein said resonator region comprises an array of structures of dielectric material, and wherein said tuner comprises a dielectric constant tuner for tuning a dielectric constant of said dielectric material.

17. The photonic crystal waveguide apparatus according to claim 15, wherein said apparatus comprises an apparatus selected from the group consisting of an on/off switch and a modulator.

18. In a photonic crystal waveguide apparatus which includes a photonic crystal, a waveguide in said photonic crystal which is capable of transmitting light having a frequency within a bandgap of said photonic crystal, and a resonant stub connected to said waveguide for controlling transmission characteristics of light in said waveguide by creating a transmission zero in said bandgap at which light having a wavelength that is otherwise capable of being transmitted by said waveguide is prevented from being transmitted by said waveguide, said resonant stub including a resonator region including structures of dielectric material, a method for tuning said transmission zero comprising tuning a dielectric constant of said dielectric material of said structures to tune said transmission zero.

19. The method according to claim 18, wherein said step of tuning said dielectric constant comprises tuning said transmission zero between a condition in which transmission of light by said waveguide is permitted and a condition in which transmission of light by said waveguide is prevented so as to provide an optical on/off switch.

20. The method according to claim 18, wherein said step of tuning said dielectric constant comprises tuning said transmission zero within a range of said bandgap so as to provide an optical modulator.

* * * * *